B. OWEN.
Cotton-Planter.
No. 21,440. Patented Sept. 7, 1858.
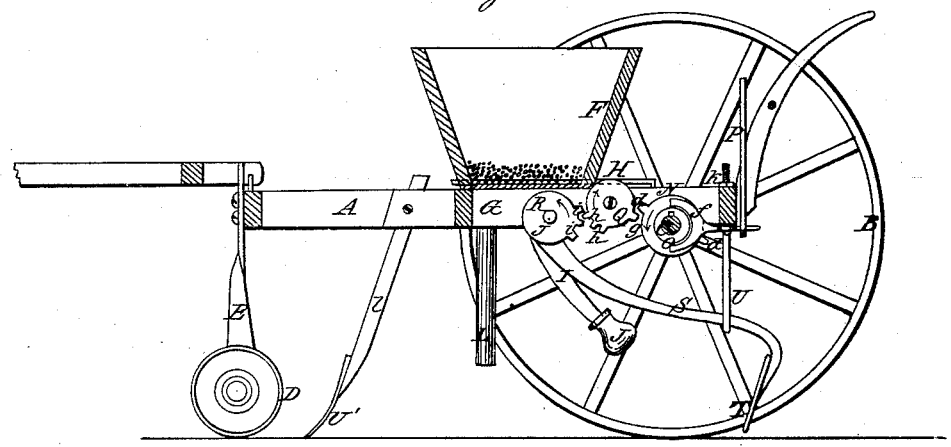
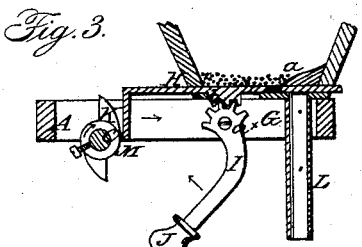
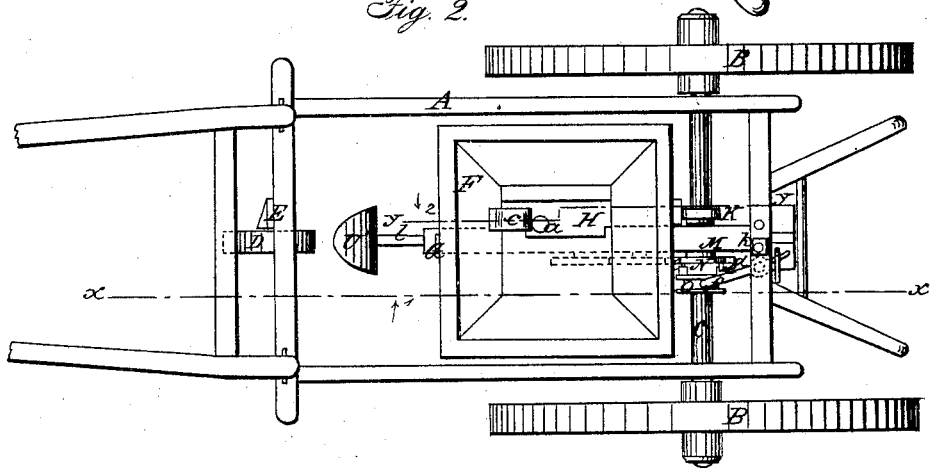

UNITED STATES PATENT OFFICE.

BENJAMIN OWEN, OF DAYTON, OHIO.

IMPROVEMENT IN SEED-PLANTERS.

Specification forming part of Letters Patent No. 21,440, dated September 7, 1858.

*To all whom it may concern:*

Be it known that I, BENJAMIN OWEN, of Dayton, in the county of Montgomery and State of Ohio, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\,x$, Fig. 3, and looking in the direction of arrow 1. Fig. 2 is a plan or top view of same. Fig. 3 is a side sectional view of a portion of same, taken in line $y\,y$, Fig. 2, and looking in the direction indicated by arrow 2.

Similar letters of reference indicate corresponding parts in the several figures.

This invention consists in a covering device, arranged as hereinafter fully shown and described, whereby seed may be covered with a proper quantity of earth by a very simple arrangement of means.

The invention is more especially designed for planting maize or Indian corn; but it may be used for planting other kinds of seed in hills.

To enable those skilled in the art to fully understand and construct my invention, I will proceed to describe it.

A represents a horizontal frame, the back part of which is supported by two wheels, B B, which are permanently attached to an axle, C. The front end of the frame A is supported by a single wheel, D, comparatively small and attached to the lower part of a pendant, E.

F is a hopper, which is placed centrally on the frame A. The hopper rests principally on a longitudinal bar, G, in the frame A, and a seed-slide, H, is fitted in the bottom of the hopper F, said slide having a hole, $a$, made through it and a short rack, $b$, at its under side. The slide H is at one side of the bar G, and a lever, I, is pivoted to the bar G, directly below the slide H. The upper end of the lever I is a geared sector, the fulcrum-pin $a^x$ of the lever being at its center and the sector gearing into the rack $b$. The lever I is of curved form, and has a weight, J, attached to it. The outer end of the seed-slide H is bent down in a vertical position, and is acted upon by a wiper, K, on the axle C.

Within the hopper F a cut-off, $c$, is placed, underneath which is the orifice of the seed-conveying tube.

The wiper K is not attached permanently to the axle C. It is secured to a collar, M, which is placed loosely on the axle and made to rotate with it.

On the collar M, and on the end opposite to that where the wiper K is attached, there is placed a circular disk, N, having two spurs or projections, $d\,d$, attached to its periphery at opposite points. (See Fig. 1.) Two pins, $e\,e$, project horizontally from the disk N, and a clutch, O, on the axle C connects the collar M with said axle, when necessary, by operating a lever, P, which is connected with the clutch by a fork, $f$.

To the bar G, and in the same plane with the disk N, a circular disk, Q, is attached. The disk Q has a spur, $g$, on its periphery, and also three teeth, $h\,h\,h$, which gear into teeth $i$ on a circular disk, R, which is at the upper end of a curved arm, S, said arm being pivoted or attached to the bar G by a pin, $j$, which passes through the center of the disk R.

To the lower end of the arm S a hoe, T, is attached, and the arm S works in a loop or guide, U, which is attached to the back of the frame A, and rendered capable of being raised and lowered by means of a nut, $k$, on one of its sides or arms, which passes vertically through the back bar of the frame.

To the front end of the bar G the standard $l$ of a furrow-share, U', is attached.

The operation is as follows: As the machine is drawn along the wiper K shoves forward the seed-slide H and raises the weight J, which, as the teeth of the wiper pass the end of the slide, throws said slide back, the seed being discharged from the hopper through tube L when the slide is shoved forward, and the hole $a$ being filled whenever the slide is shoved back. The spurs or projections $d\,d$ of the disk N actuate the disk Q, which in turn actuates through disk R the arm S and raises the hoe T, which falls by its own gravity and covers the seed discharged through tube L, the position of the wiper K on the collar M being placed in such relation to the disk N that the hoe T will drop at the proper time to cover the seed, and the hoe may be made to penetrate the earth to a greater or less depth by adjusting the loop or guide U to a proper height. By this invention the machine is rendered extremely simple, and cannot readily get out of repair, all springs are avoided, and the relative movement of the slide H and hoe T may be regulated, as desired, by properly adjusting the wiper K on its collar.

I am aware that covering-hoes T have been previously used and arranged to rise and fall, as shown, and I therefore do not claim broadly such device irrespective of the particular means employed for operating it. Neither do I claim separately and irrespective of the means of operation a reciprocating seed-slide.

What I claim therefore as new, and desire to secure by Letters Patent, is—

Operating the arm S and hoe T by means of the disks N Q R, provided with teeth or spurs, and arranged as and for the purpose set forth.

BENJ. OWEN.

Witnesses:
GEO. W. HOUK,
JOHN KENNEDY.